(12) United States Patent
Willetts

(10) Patent No.: US 6,543,586 B1
(45) Date of Patent: Apr. 8, 2003

(54) SCRAPER ASSEMBLY

(75) Inventor: Jesse Willetts, Parma, OH (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/797,451

(22) Filed: Mar. 1, 2001

(51) Int. Cl.$^7$ ............................................. F16D 65/00
(52) U.S. Cl. ................................ 188/73.1; 188/250 G
(58) Field of Search ........................... 188/73.31, 73.1, 188/24.11, 24.12, 24.13, 24.22, 250 G, 250 B, 71.1, 258

(56) References Cited

U.S. PATENT DOCUMENTS

| | | | |
|---|---|---|---|
| 2,496,699 A | 2/1950 | Clark | 188/72 |
| 2,713,923 A | 7/1955 | Eksergian et al. | 188/251 |
| 3,119,468 A | 1/1964 | Mossey | 188/73 |
| 3,473,631 A | 10/1969 | Schmid | 188/73 |
| 3,629,814 A | 12/1971 | Klein | 340/52 A |
| 3,993,174 A | * 11/1976 | Williams et al. | 188/344 |
| 4,230,208 A | 10/1980 | Gale | 188/73.1 |
| 4,270,631 A | 6/1981 | Kobelt | 188/72.9 |
| 5,107,965 A | 4/1992 | Yates | 188/24.22 |
| 5,464,075 A | 11/1995 | Everett | 188/24.12 |

FOREIGN PATENT DOCUMENTS

| | | |
|---|---|---|
| DE | 3316524 A1 * | 11/1984 |
| GB | 2027825 A * | 2/1980 |

* cited by examiner

Primary Examiner—Douglas C. Butler
Assistant Examiner—C. T. Bartz
(74) Attorney, Agent, or Firm—Marvin L. Union

(57) ABSTRACT

A scraper assembly for use with a disc brake including a scraper blade which continually engages with the braking surface of the disc brake to remove dirt, oil and other extraneous materials from the braking surface to increase the coefficient of friction of the braking surface. A weight is provided for biasing the scraper blade with a substantially constant force into engagement with the braking surface. The scraper blade and weight are disposed in a channel which guides and supports the scraper blade into a position in which the blade is engaged with the braking surface.

3 Claims, 5 Drawing Sheets

SCRAPER ASSEMBLY

BACKGROUND OF THE INVENTION

The present invention relates to a new and improved disc brake assembly, and more specifically, to a disc brake assembly including a scraper assembly which engages with the annular braking surface of the disc brake to remove dirt, oil and other contaminants from the braking surface. The disc brake is particularly or adapted for use on a grinding mill.

Mechanisms for cleaning brake surfaces and more particularly disc brake surfaces are known and disclosed in U.S. Pat. No. 3,473,631 entitled Disc Brake And Disc Cleaning Mechanism and U.S. Pat. No. 3,629,814 entitled Disc Brake Rotary Scraper And Wear Indicator Means. In the known disc cleaning mechanisms the scraper assembly is either spring biased into the braking surface or attached to the brake shoe for movement therewith. In both cases, the force between the scraper assembly and the disc varies upon engagement of the scraper assembly with the braking surface.

SUMMARY OF INVENTION

The present invention provides a new and improved brake assembly which includes a scraper assembly having a scraper blade which is continually biased into engagement with the braking surface. The scraper blade is biased into engagement with the braking surface by a weight which exerts a substantially constant force against the scraper blade to establish a substantially constant force between the scraper blade and the braking surface.

The present invention further provides a new and improved scraper assembly for use with a disc brake including a rotatable disc having an annular braking surface disposed thereon and a caliper assembly including a friction shoe for engaging with the annular braking surface to retard movement of the disc. The scraper assembly includes a scraper blade which continually engages with the annular braking surface on the disc as the disc rotates to remove dirt, oil and other extraneous materials from the braking surface to increase the coefficient of friction of the braking surface, a channel for guiding and supporting the scraper blade in a position in which the scraper blade is engaged with the braking surface and a weight associated with the scraper blade for biasing the scraper blade through the channel into engagement with the braking surface and wherein the force exerted between the scraper blade and the braking surface of the disc is substantially constant.

A still further provision of the present invention is to provide a grinding mill having a cylindrical container rotatable about an axis of rotation for receiving material to be worked therein wherein the cylindrical container includes an annular braking surface thereon disposed substantially perpendicular to the axis of rotation of the mill. A scraper assembly is provided including a scraper blade for continuously engaging the annular braking surface to remove oil, grease and other contaminants from the braking surface. A caliper assembly is provided including a friction shoe which engages with the annular braking surface when the caliper assembly is actuated to retard rotation of the cylindrical container about the axis of rotation. The scraper assembly includes a support for supporting the scraper blade adjacent the annular braking surface in a position in which a first end of the scraper blade is engaged with the braking surface, preventing movement of the scraper blade in a direction tangential to the rotating annular braking surface and providing for movement of the scraper blade in a direction toward and away from the annular braking surface and a weight for biasing the scraper blade through said support into engagement with said annular braking surface.

Another provision of the present invention is to provide a scraper blade for continuously engaging with an annular rotating braking surface of a disc brake for use in a scraper assembly including a channel for guiding movement of the scraper blade toward and away from the annular rotating braking surface and a weight for biasing movement of the scraper blade through the channel. The scraper blade including a first end for continuously engaging with the annular braking surface and a second end for engaging with the weight to enable the weight to bias, with a substantially constant force, the first end of the scraper blade into engagement with the annular braking surface to remove dirt, oil and other contaminants from the braking surface to increase the coefficient of friction of the braking surface.

DESCRIPTION OF THE PREFERRED EMBODIMENT

Figure 1:
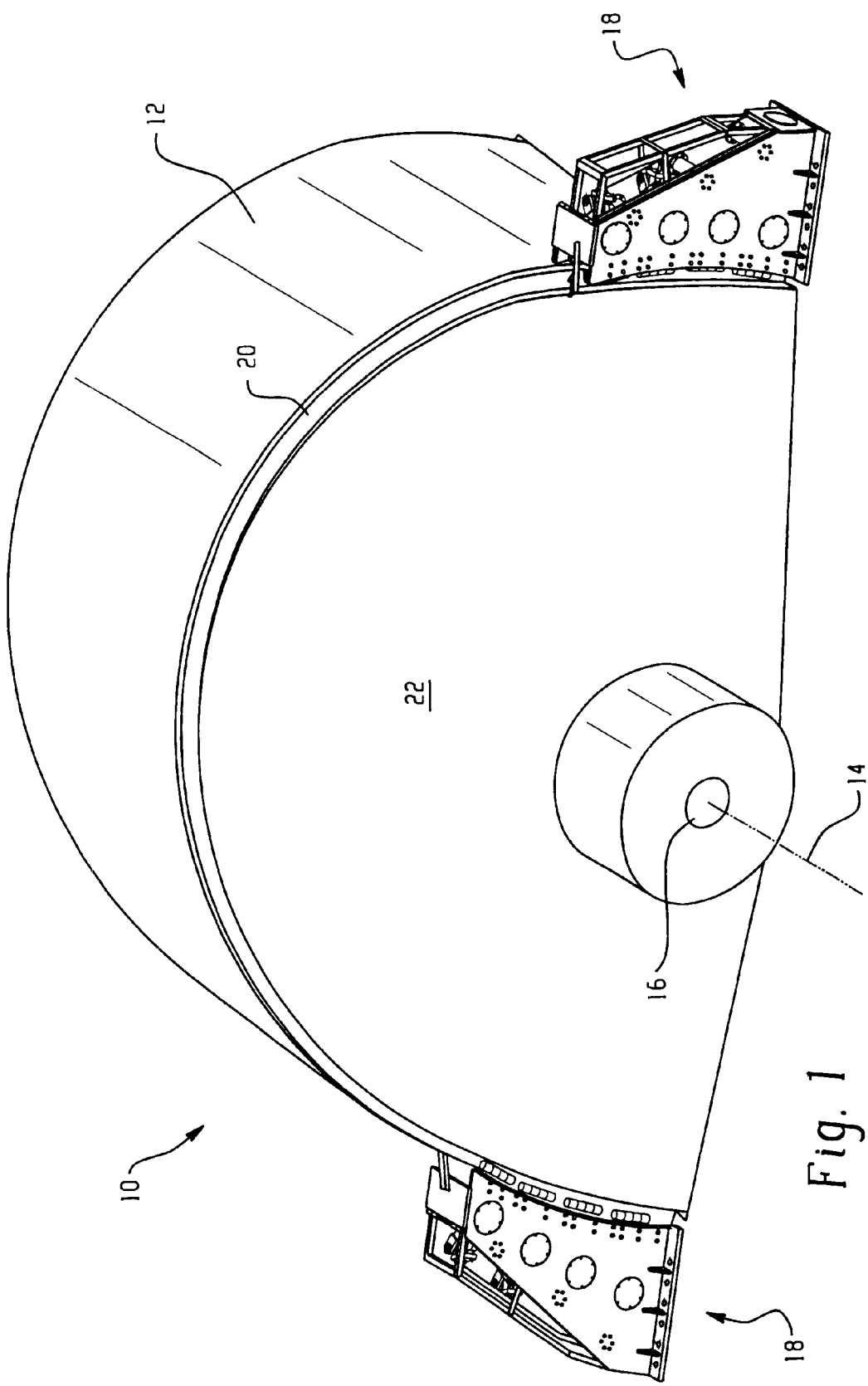
FIG. 1 is a perspective view of a grinding mill incorporating the scraper assembly of the present invention.

Referring to the figures and more particularly to FIG. 1 a grinding mill 10, which in the preferred embodiment is a ball or rod mill, is illustrated. The grinding mill 10 includes a cylindrical container or drum 12 which rotates about an axis of rotation 14. A drive, not illustrated, is provided for effecting rotation of the drum 12. The cylindrical drum 12 is adapted to have ore or other materials placed therein to be worked as the grinding mill rotates in a well-known manner. A pair of caliper brake assemblies 18 are disposed on opposite sides of the drum 12 to retard rotation of the drum 12 about the axis of rotation 14.

The drum 12 includes an annular braking surface 20 including substantially parallel surfaces 20a, 20b disposed on opposite side of 20 for rotation therewith. The annular braking surface 20 is disposed substantially perpendicular to the axis of rotation 14 of drum 12 and functions as a disc of a disc brake. When it is desired to stop rotation of drum 12, the brake assemblies 18 are actuated to engage the annular braking surface 20 to retard rotation of the drum 12. While the preferred embodiment of the present invention is illustrated in conjunction with a grinding mill 10, it should be appreciated that the invention is adaptable to any disc brake assembly and the annular braking surface 20 and brake assemblies 18 operate as a disc brake even though braking surface 20 is an integral part of grinding mill 10.

The drum 12 is supported for rotation about its axis of rotation 14 by a plurality of bearings, not illustrated, which are centrally located around the axis of rotation 14 at 16 and which are continuously lubricated by pressurized lubricants to reduce the high forces which can be exerted on the bearings by the drum 12, particularly when the drum 12 is loaded with material to be worked. The continuous lubrication of the bearings at 16 with pressurized lubricants causes lubricants to spread by centrifugal force as drum 12 rotates from 16 along an outer radial surface 22 of the drum 12 and to the surface 20a of the annular braking surface 20. Contamination of the braking surface 20a with lubricant reduces the coefficient of friction of the braking surface 20 and interferes with proper braking of the rotating grinding mill 12. It should be appreciated that in the present embodiment only one side of the annular braking surface 20 becomes contaminated by lubricants from the bearings which support drum 12 for rotation. The side of annular braking surface 20a adjacent radial surface 22 tends to become contaminated with lubricants while the opposite side, surface 20b, does not become contaminated as lubricants cannot move by centrifugal force from the bearings to the annular braking surface 20b.

Figure 2:
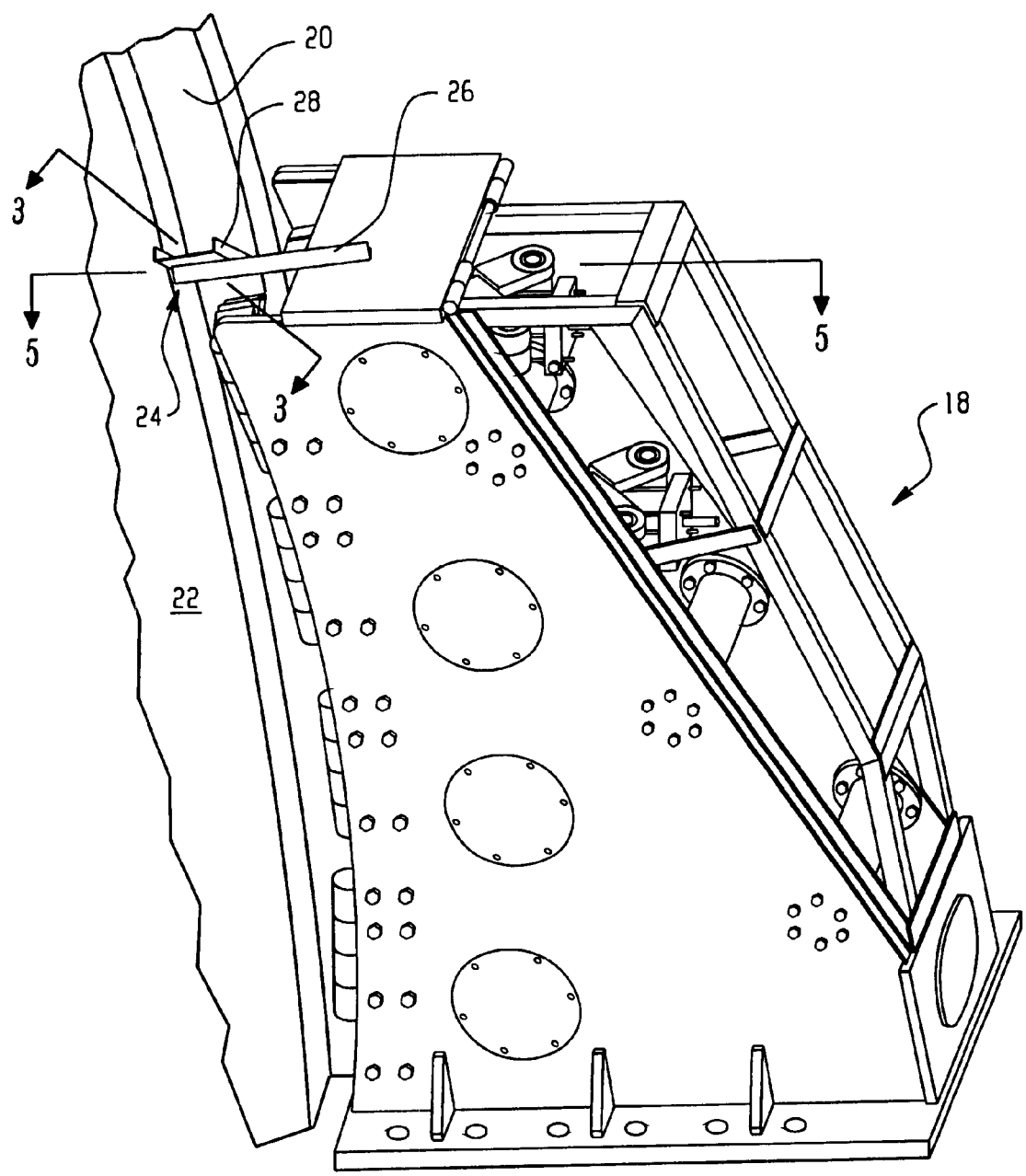
FIG. 2 is an enlarged portion of FIG. 1 more fully illustrating the support for the scraper assembly and the caliper assembly for braking the rotating drum of the grinding mill.
Figure 3:
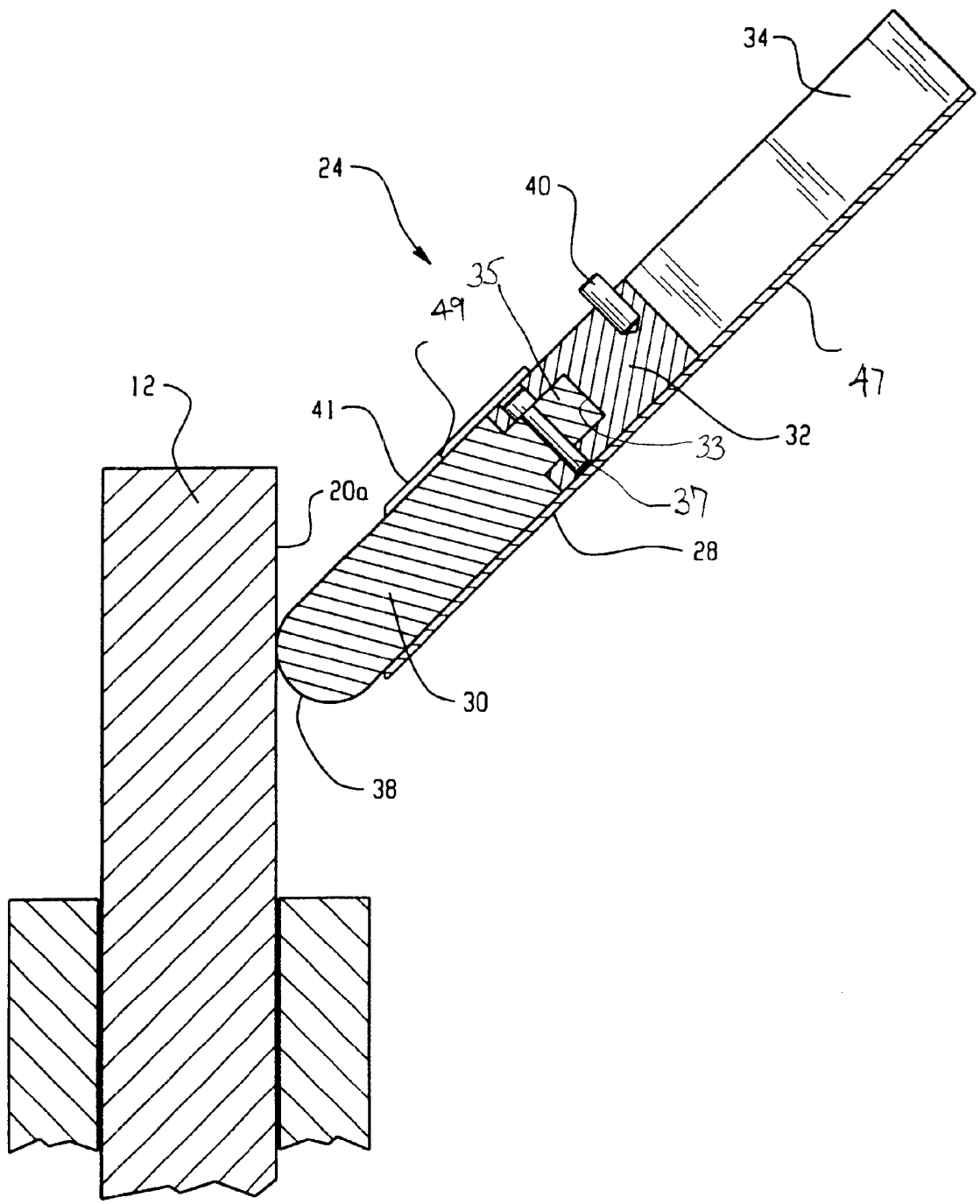
FIG. 3 is a fragmentary cross-sectional view taken approximately along the lines 3—3 of FIG. 2 more fully illustrating the cross sectional configuration of the scraper blade, support assembly and the annular braking surface on the grinding mill.
Figure 4:
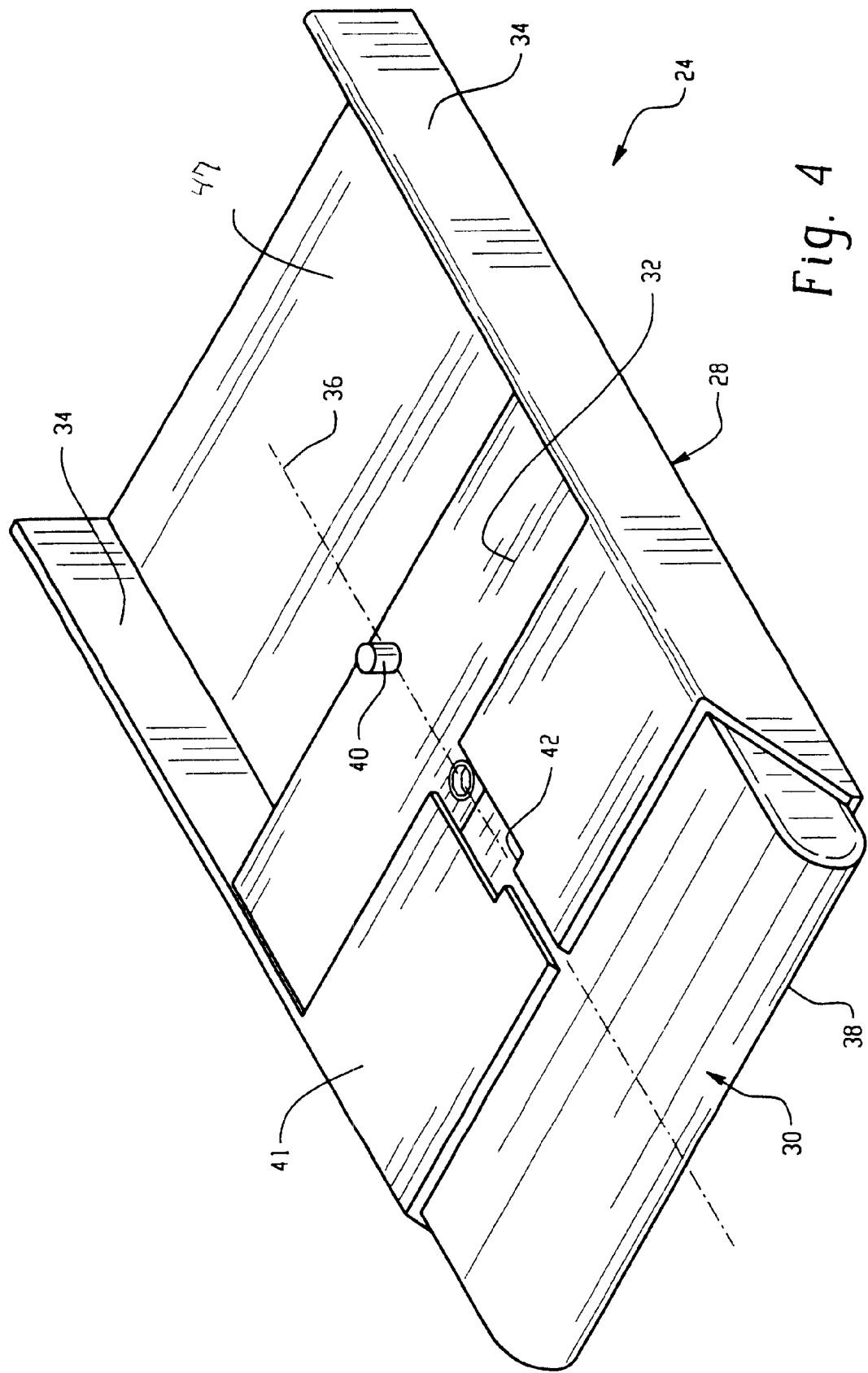
FIG. 4 is a perspective view of the scraper assembly illustrating the scraper blade, the support channel and the weight for biasing the scraper blade through the channel.

As is more fully illustrated in FIGS. 2–4 a scraper assembly 24 is provided adjacent annular braking surface 20a to remove from the annular braking surface 20a any contaminates such as oil, grease, lubricants or dirt which are located on the annular braking surface 20a. Since in the present embodiment only one side of the annular braking surface 20 becomes contaminated with lubricants, only one scraper assembly will be illustrated, associated with the side 20a of the annular braking surface 20 which becomes contaminated with lubricants. If desired or necessary, a scraper assembly can be used with each side of the annular braking surface 20. The scraper assembly 24 is supported by member 26 which is attached to the brake assembly 18 in a position in which the scraper assembly 24 is disposed adjacent to the annular braking surface 20a. The scraper assembly 24 includes a support or channel 28, a scraper blade member 30 and a weight 32. The scraper blade 30 and the weight 32 are disposed within the channel 28 and move through the channel 28 as a result of the gravitational force of the weight 32 acting on the scraper blade 30. The weight 32 biases the scraper blade 30 into engagement with braking surface 20a with a substantially constant force. The weight 32 includes a recess 33 and the scraper blade 30 include a tongue or projection 35 which is received in the recess 33 disposed in weight 32. A fastener 37 interconnects weight 32 and scraper blade 30 so that the weight 32 and scraper blade 30 move as a unit through channel 28.

The channel 28 includes a pair of sidewalls 34 between which the scraper blade 30 and weight 32 are supported. The side walls 34 of the channel 28 engage with the side surfaces of the scraper blade 30 to prevent movement of the scraper blade 30 and weight 32 in a direction tangential to the annular braking surface 20. The support or channel 28 further includes a top surface 41 and a bottom surface 47 which extend between sidewalls 34 to support the scraper blade 30 and weight 32. The channel 28 includes a longitudinal axis 36 which is parallel to the sidewalls 34. The scraper blade 30 and weight 32 are supported by the bottom surface 47 of channel 28 to move in a direction parallel to the longitudinal axis 36. Top surface 41 prevents movement of the scraper blade 30 and weight 32 in a radial direction relative to the axis of rotation 14 and in a direction away from bottom surface 47.

The scraper blade 30 has a rounded cross sectional configuration at one end 38 thereof to facilitate quick seating of the scraper blade 30 with the annular braking surface 20. As annular braking surface 20 rotates with the drum 12, the first end 38 of the scraper blade 30 engages with the annular braking surface 20a to remove any contaminates such as oil or grease which are disposed on the annular braking surface 20a to increase the coefficient of friction of the annular braking surface 20a to facilitate retarding of the rotating drum 12.

A stop pin 40 is connected to the weight 32 to move therewith in a direction parallel to the longitudinal axis 36. The stop pin 40 is disposed substantially perpendicular to bottom surface 47 of channel 28 and is operable to engage with a stop surface 49 located on top surface 41 of the channel 28 to prevent further movement of the scraper blade 30 and weight 32 toward the annular braking surface 20 when the stop pin 40 engages with the stop surface 49. When the stop pin 40 engages with the stop surface 42, the scraper blade 30 is worn and should be replaced.

In the preferred embodiment of the invention, the scraper blade 30 is constructed of a plastic or polyurethane such as HYTREL #7246 manufactured by Buckey Rubber & Packing Co. of Cleveland, Ohio which has good wear characteristics and which acts to remove contaminates from the annular braking surface 20. If desired, other materials such as HYTREL #5555 HS could be used to form scraper blade 30. When the stop pin 40 engages with stop surface 49 on channel 28 and it is desired to replace the scraper blade 30, a user can grasp stop pin 34 to remove the weight 32 and the worn scraper blade 30 from channel 28 as a unit. The fastener 37 can then be removed and a new scraper blade 30 can be attached to weight 32 by reinserting fastener 37. The new scraper blade 30 and the weight 32 are replaced as a unit in the channel 28 to again bias the scraper blade 30 with a substantially constant force into engagement with the annular braking surface 20a.

In the present embodiment it has been found preferable to construct the scraper blade 30 from HYTREL #7246 which exhibits good wear characteristics as the scraper blade 30 engages with the annular braking surface 20. In the preferred embodiment when the annular braking surface 30 is disposed on a grinding mill 10, the annular braking surface 20 has a diameter of between 25 and 45 feet and the grinding mill has a maximum speed of rotation of approximately 10 (ten) revolutions per minute. This effects passage of the annular braking surface 20a relative to the scraper blade 30 at a maximum rate of approximately 150 feet per minute. It should be appreciated that other materials could be utilized in forming the scraper blade depending upon the speed of rotation of the braking surface 20 relative to the scraper blade 30.

Figure 5:
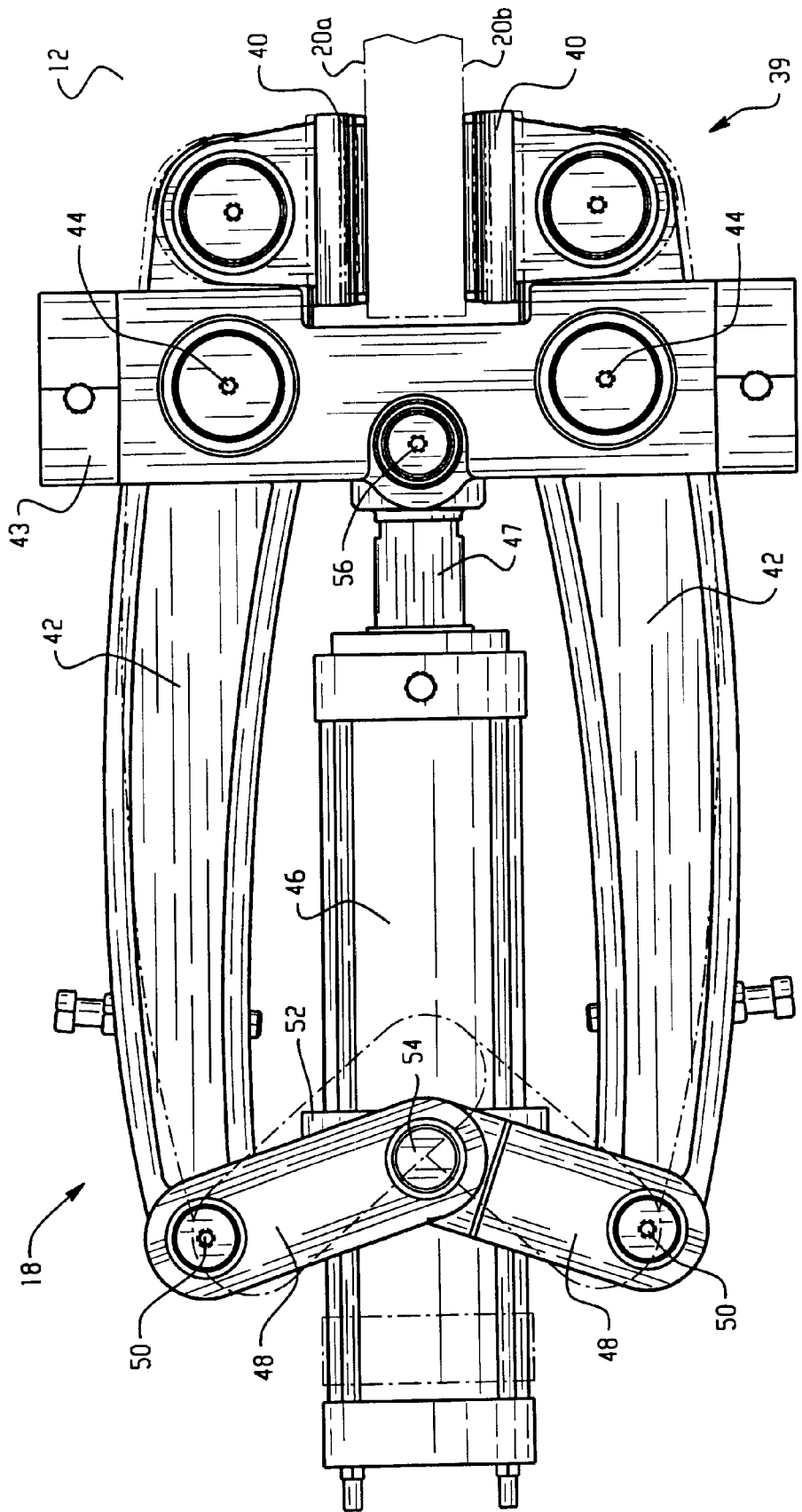
FIG. 5 is a fragmentary schematic view taken approximately along the lines 5—5 of FIG. 2 more fully illustrating one of the caliper assembly for actuating the brake.

Referring to FIG. 5, the brake assembly 18 includes a caliper assembly 39 which includes a pair of friction shoes or pads 40 which are adapted to engage with the annular braking surfaces 20a and 20b disposed on the circumference of the drum 12 to retard rotation of the drum 12 when the caliper assembly 39 is actuated. The friction pads 40 are supported on one end of each of the caliper arms 42 which are supported at 44 for pivotal movement by a fixed support 43. A fluid cylinder 46 is connected to a pair of links 48 which are pivotably connected at 50 to one end of each of the caliper arms 42. The links 48 are pivotable connected at 54 to a support member 52 which is rigidly connected to cylinder 46 to move therewith upon actuation of the fluid cylinder 46. The fluid cylinder 46 includes a fluid piston 47 which has one end 56 which is rigidly connected to the fixed support member 43. When cylinder 46 is pressurized, piston 47 is fixed at 56 and cylinder 46 moves to its phantom line position illustrated in FIG. 5 to pivot caliper arms 42.

When the hydraulic cylinder 46 is extended to its full line position illustrated in FIG. 5, the caliper arms 42 are pivoted about 44 to engage friction shoes 40 with opposite sides 20a and 20b of the annular braking surface 20. When the cylinder 46 is contracted to its phantom line position shown in FIG. 5, the caliper arms 42 pivot about 44 and the friction shoes 40 move away from the annular braking surface 20 to a disengaged position.

In the present embodiment, the brake 18 is spring applied and fluid released. A spring, not illustrated, is utilized to bias the linkage 42, 48 and cylinder 46 to its fully extended position, illustrated in full lines in FIG. 5, in which position the brake is engaged and the friction shoes 40 engage with the annular braking surface 20 to retard rotation of the annular braking surface 20 and drum 12. When fluid pressure is applied to the cylinder 46, the cylinder 46 contracts to its phantom line position, illustrated in FIG. 5, against the force of the spring to pivot caliper arms 42 to move friction shoes 40 away from the annular braking surface 20 to move the caliper assembly 39 to its disengaged position. Thus, the brake is fail safe in that if fluid pressure is lost in cylinder 46, the springs, not illustrated, will operate to move cylinder 46 and linkage 48, 42 to their full line position to apply a braking force to retard rotation of the drum 12. The brake 18 can only be released by applying fluid pressure to cylinder 46 to overcome the spring applied braking force.

While the present invention has been illustrated in conjunction with a grinding mill 10, it should be appreciated that other disc brake assemblies could be fitted with scraper assemblies having a similar or identical construction wherein a scraper blade 30 is weight biased through a channel 28 against the rotating braking surface 20 to remove contaminates from the braking surface. Use of weight 32 to bias the scraper blade 30 offers a distinct advantage over prior art systems some of which were spring biased. The use of a spring to bias the scraper results in a nonuniform force being applied to the scraper blade 30 as the spring expands or contracts, as springs do not bias with a constant biasing force. The biasing effect of the spring is dependent upon the degree of expansion or contraction of the spring and the spring constant and is not uniform.

From the foregoing, it should be apparent that a new and improved scraper assembly 24 for use with a disc brake or a grinding mill 10 having a rotatable disc 20 having annular braking surfaces 20a, 20b disposed thereon has been provided. A caliper assembly 39 includes friction shoes 40 for engaging with the annular braking surface 20a, 20b when the caliper assembly 39 is actuated to retard rotation of the annular braking surface. The scraper assembly 24 includes a scraper blade 30 which continually engages with the annular braking surface 20a as the braking surface 20 rotates to remove dirt, oil and other contaminants from the braking surface 20 to increase the coefficient of friction of the braking surface to improve performance of the brake. The scraper assembly 24 includes a channel 28 for guiding and supporting the scraper blade 30 in a position in which the scraper blade 30 is engaged with the braking surface 20a and a weight 32 for biasing the scraper blade 30 through the channel 28 and into engagement with the braking surface 20a and wherein the force exerted by the scraper blade 30 on the braking surface 20a is substantially constant.

I claim:

1. A scraper assembly for use with a disc brake having a rotatable disc having an annular braking surface disposed thereon and a caliper assembly including a friction shoe for engaging with said annular braking surface on said rotatable disc when said caliper assembly is actuated to retard movement of the disc, said scraper assembly comprising a scraper blade which continually engages with said braking surface on said rotatable disc as said disc rotates to remove dirt, grease, and oil from said braking surface to increase the coefficient of friction of said braking surface to improve the performance of said disc brake, a channel for guiding and supporting said scraper blade in a position in which said scraper blade is engaged with said braking surface on said rotatable disc, a weight associated with said scraper blade biasing said scraper blade through said channel and into engagement with said braking surface of said rotatable disc to remove dirt, grease and oil from said braking surface and wherein the force exerted by said scraper blade on said braking surface of said disc is substantially constant, said scraper blade including a first end for engaging with said braking surface disposed on said disc and a second end for engaging with said weight, said weight exerting a constant force on said second end of said scraper blade to bias the scraper blade through said channel to engage said first end of said scraper blade with said rotating brake surface to remove dirt, grease and oil from said braking surface, said first end of said scraper blade having a rounded cross sectional configuration taken approximately perpendicular to the braking surface to allow the scraper blade to quickly seat on the annular braking surface with which said scraper blade is engaged a stop pin operatively connected with said scraper blade to move therewith and a stop surface on said channel, said stop pin engaging with said stop surface on said channel to prevent further movement of said scraper blade toward said braking surface when said scraper blade wears a predetermined maximum amount.

2. A scraper assembly for use with a disc brake having a rotatable disc having an annular braking surface disposed thereon and a caliper assembly including a friction shoe for engaging with said annular braking surface on said rotatable disc when said caliper assembly is actuated to retard movement of the disc, said scraper assembly comprising a scraper blade which continually engages with said annular braking surface on said rotatable disc as said disc rotates to remove dirt, grease, and oil from said braking surface to increase the coefficient of friction of said braking surface to improve the performance of said disc brake, a channel for guiding and supporting said scraper blade in a position in which said scraper blade is engaged with said braking surface on said rotatable disc and a weight associated with said scraper blade biasing said scraper blade through said channel and into engagement with said braking surface of said rotatable disc to remove dirt, grease, and oil from said braking surface and wherein the force exerted by said scraper blade on said braking surface of said disc is substantially constant and wherein said channel has a longitudinal axis, said scraper blade has a pair of substantially parallel side surfaces, and said channel includes a pair of side walls disposed substantially parallel to said longitudinal axis of said channel and each of which engages with one of said side surfaces of said scraper blade to position the scraper blade therebetween to prevent movement of said scraper blade relative to said rotating disc in a direction tangential to said disc, said channel providing for movement of said scraper blade in a direction substantially parallel to the longitudinal axis of said channel.

3. A scraper blade for continuously engaging with an annular rotating braking surface of a disc brake for use in a scraper assembly including a channel for guiding movement of the scraper blade toward and away from the annular rotating brake surface and a weight for biasing movement of the scraper blade through the channel, said scraper blade including a first end for continuously engaging with said annular braking surface of the disc brake and a second end for engaging with the weight to enable the weight to bias, with a substantially constant force, said first end of said scraper blade into engagement with the annular braking surface of the disc brake to remove dirt, oil, and grease from the annular braking surface to increase the coefficient of friction of the annular braking surface to enable the rotating braking surface to be effectively retarded, wherein said first end of said scraper blade has a rounded configuration taken approximately perpendicular to the braking surface to allow the scraper blade to quickly seat on the friction surface with which said scraper blade is engaged and wherein said second end of said scraper blade includes a projection and said weight includes a complementary recess therein for receiving said projection on said scraper blade therein and further including a fastener for connecting said scraper blade to said weight to enable the scraper blade and weight to move together through said channel.

* * * * *